Sept. 22, 1970     P. E. SMITH     3,529,686
SCALE EMPLOYING ROLLER BEARINGS
Filed Oct. 10, 1968     3 Sheets-Sheet 1
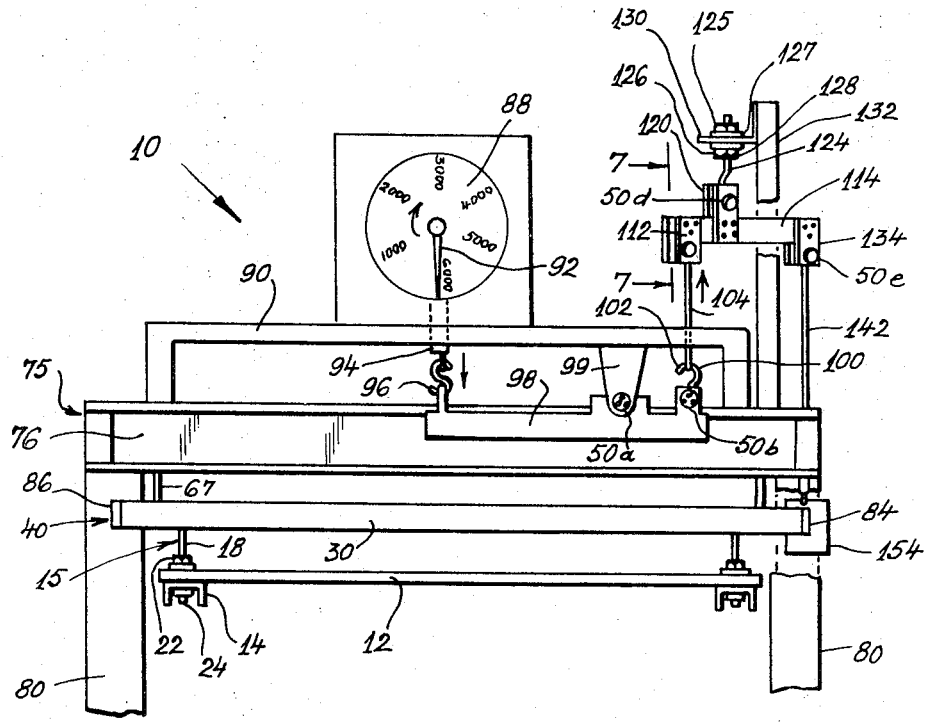
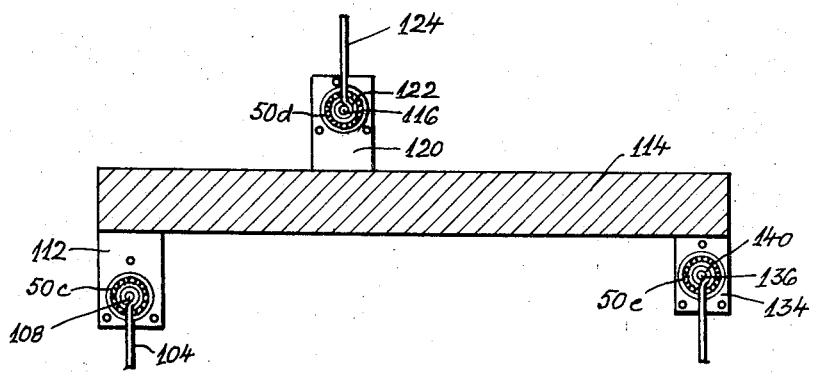
INVENTOR
Paul E. Smith
BY Polachek & Saulsbury
ATTORNEYS Sept. 22, 1970     P. E. SMITH     3,529,686
SCALE EMPLOYING ROLLER BEARINGS
Filed Oct. 10, 1968     3 Sheets-Sheet 2

INVENTOR
Paul E. Smith
BY Polachek & Saulsbury
ATTORNEYS

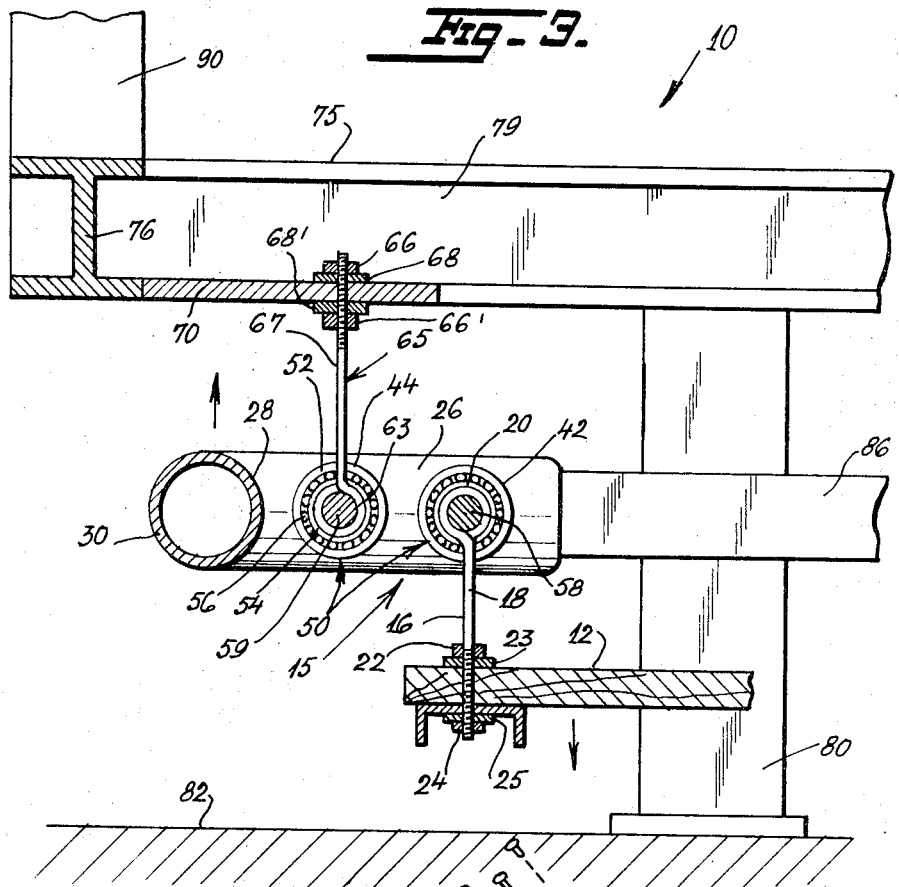
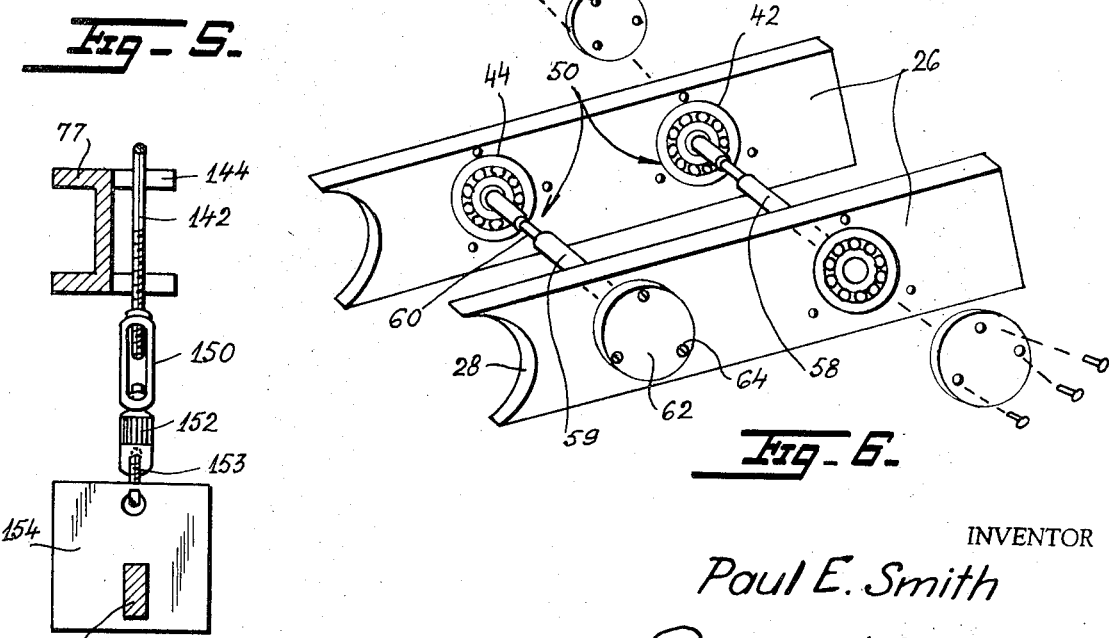

United States Patent Office 3,529,686
Patented Sept. 22, 1970

3,529,686
SCALE EMPLOYING ROLLER BEARINGS
Paul E. Smith, East Peoria, Ill. (% Capitol Scale Co., 927 SW. Washington St., Peoria, Ill. 61602)
Filed Oct. 10, 1968, Ser. No. 766,541
Int. Cl. G01g 21/08
U.S. Cl. 177—201
9 Claims

ABSTRACT OF THE DISCLOSURE

A platform scale for weighing heavy loads has replaceable roller bearing assemblies at critical pivot points. A dial scale is operatively connected to the platform by a leverage system. Knife edge pivot points and square bearing of prior scales are avoided.

---

This invention relates to the art of weighing scales and more particularly concerns a platform scale for weighing heavy loads in a deep or shallow pit.

Heretofore scales designed for weighing heavy loads have employed knife edge or diamond shaped pivot points and joints on which levers are balanced and pivoted. Such points and joints are subject to very rapid wear when heavy loads of several tons are repeatedly weighed. Replacement of the pivot points and joints is a costly time consuming operation.

Between pivot point and joint replacements, objectionable errors in weighing occur frequently due to partially worn pivot points and joints.

The present invention is directed at overcoming this objectionable situation by providing a platform scale for weighing heavy loads which has roller ball bearing assemblies at critical locations. At all four corners of the platform are replaceable roller bearing assemblies arranged in pairs with one roller bearing connected to the platform and the other connected to a fulcrum support. Levers having roller bearings at fulcrum and ends connect the platform with a direct reading dial. If any roller bearing assembly becomes worn it can easily and quickly be replaced.

Various objects, features and advantages of the invention will become apparent upon reading the following specification together with the accompanying drawing forming a part thereof.

Referring to the drawing:

FIG. 1 is a front elevational view of a scale embodying the invention.

Figure 2:
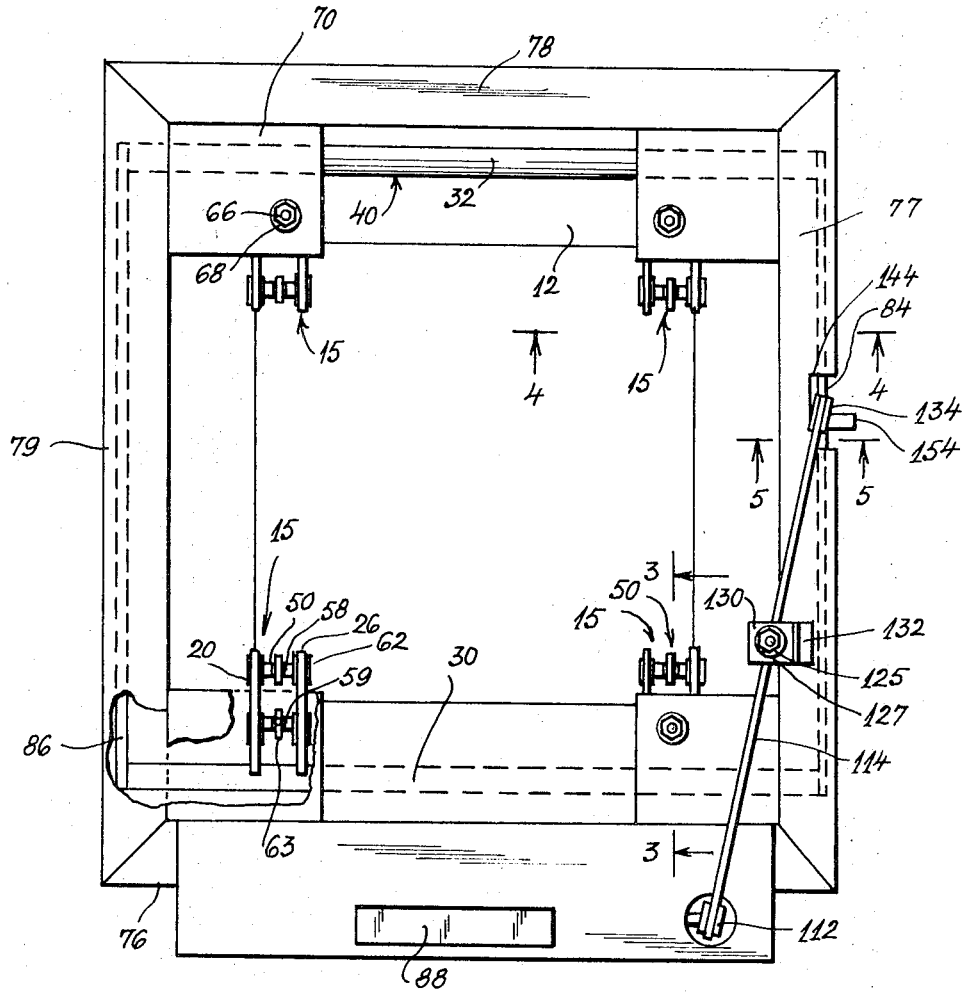
FIG. 2 is a top plan view of the scale.
Figure 4:
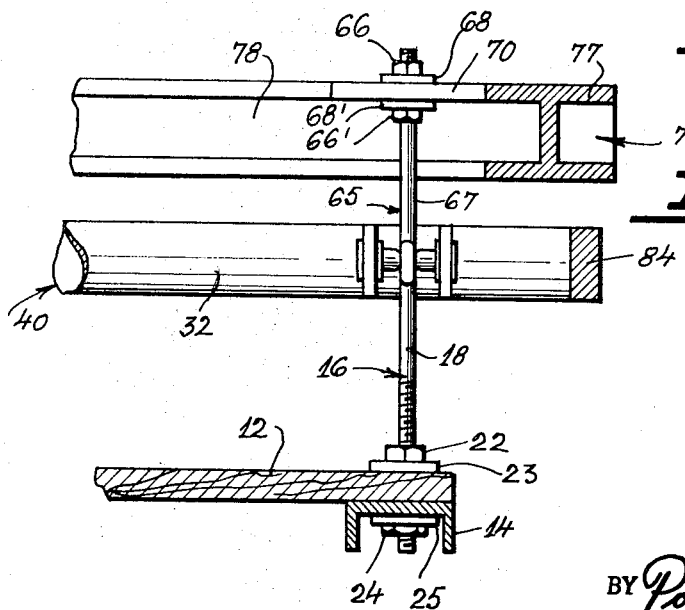

FIGS. 3, 4 and 5 are enlarged sectional views taken on lines 3—3, 4—4 and 5—5 respectively of FIG. 2.

FIG. 6 is a perspective view of the scale in partially exploded form showing a hanger assembly employed in the scale and having roller ball bearings according to the invention.

FIG. 7 is an enlarged sectional view taken on line 7—7 of FIG. 1 through a lever.

Referring to the drawing, there is shown a scale 10 having a horizontal rectangular platform 12 supported on two horizontal channel bars 14 located underneath the platform at opposite lateral margins thereof. At each corner of the platform is a hanger assembly 15 including a first eyebolt 16. The shank 18 of the eyebolt is vertically disposed and extends downwardly from eye 20. The lower end of shank 18 is threaded and engages nuts 22 and 24 on the platform and under the channel bar respectively (see FIG. 3.) Washers 23, 25 are interposed under nut 22 and above nut 24.

The hanger assembly further includes two parallel hanger bars or plates 26. These plates are formed with curved ends 28 which are welded to front tubular bar 30 or rear tubular bar 32 of scale frame 40. Two holes 42, 44 are formed in each of plates 26 (see FIG. 6). In these holes fit roller ball bearing assemblies 50. Each bearing assembly 50 includes an outer race or ring 52 and an inner race or ring 54 between which are engaged ball bearings 56. Frictionally fitted in the inner ring 54 is a shaft 58 or 59 having central circumferential groove 60. End disks or plates 62 are attached to outer sides of plates 26 by screws 64. Any one or both of these disks 62 can be removed to slide the entire assembly of rings 52, 54, ball bearings 56 and shaft 58 or 59 out of the aligned holes 42 or 44 in plates 26.

Eye 20 of eyebolt 16 is engaged on the inner shaft 58. On the outer shaft 59 which is horizontal and parallel to shaft 58 is engaged eye 63 of another eyebolt 65. The shank 67 of eyebolt 65 is vertical and extends upwardly. Nuts 66, 66' and washers 68, 68' engage the upper threaded end of shank 67 on one of four horizontal plates 70. The plates 70 are welded to corners of a massive stationary rectangular frame 75 formed by four channel bars or girders 76, 77, 78 and 79. Frame 75 is supported by vertical posts 80 on the ground 82 or bottom of a pit.

Platform 12 is supported by horizontal frame 40 which includes the two front and rear tubular bars 30, 32 and two flat side bars 84, 86 welded to ends of the tubular bars to form a rigid frame. Frame 40 is in turn supported by the frame 75.

A direct reading numerical dial 88 is supported on a frame 90 upon front channel bar 76. This dial has a pointer 92 which rotates around the dial when drawbar 94 is pulled down (see FIG. 1). Drawbar 94 is connected by an S-hook to one end of lever 98. The lever is pivotally supported at an intermediate point by a replaceable bearing assembly 50a in bracket 99 secured to frame 90. The other end of lever 98 has replaceable bearing assembly 50b engaged by a hook 100 engaged with eye 102 at the bottom end of a rod 104. The upper end of the rod is formed with an eye 106 engaged on shaft 108 of a ball bearing assembly 50c supported by parallel hanger plates 112 at one end of lever 114 (see FIGS. 1 and 7).

Lever 114 is supported on shaft 116 of a ball bearing assembly 50d mounted between hanger plates 120 attached to lever 114. The ball bearing assembly 50d engages eye 122 of an eyebolt 124. The eyebolt 124 has its upper threaded end secured by nuts 125, 126 and washers 127, 128 to a bracket plate 130 secured to a post 132 on side channel bar 77 of frame 75.

The other end of lever 114 carries depending hanger plates 134. These plates carry shaft 136 of a roller bearing assembly 50e. On shaft 126 is engaged eye 140 of a long eyebolt 142. The eyebolt 152 extends through cutouts 144 in flanges of side channel bar 77 (see FIG. 5). The lower end of the eyebolt 152 terminates at the top of a turnbuckle 150. A turnable coupling 152 carried by the turnbuckle 150 engages a C-hook 153 which in turn is engaged on a vertical plate 154 rigidly mounted at an intermediate point of frame bar 84. Ball bearing assemblies 50a–50e have the same construction as assembly 50 shown in FIGS. 3 and 6.

In operation of the scale, when a weight is placed on platform 12, rod 30 or 32 of frame 40 will tend to rise as indicated by arrow A in FIG. 3, since hanger plates 26 will turn around outer shafts 59. The upper movement of rod 30 or 32 causes a corresponding downward movement of side bars 84 and 86. When bar 84 moves down eyebolt 152 is pulled down which tilts lever 114 and rod 104 moves up. This tilts lever 98 and drawbar 94 is pulled down to provide a direct reading of the weight on the platform 12. If during repeated operation, any one or more of the ball bearing joints should wear they can easily be removed from the hanger plates and replaced with other ball bearing assemblies.

The platform 12 and frame 40 have been shown suspended below frame 75. However, it will be apparent they could be located above the frame by inverting the supporting eyebolts 62.

While I have shown and described what I believe to be the best embodiment of my invention, it will be apparent to those skilled in the art that various changes and modifications may be made therein without departing from the spirit and scope of the invention as defined in the appended claims.

What is claimed is:

1. A scale for weighing heavy articles, comprising a massive rigid stationary horizontal support; a rectangular tiltable frame horizontally disposed parallel to said support; a horizontal platform disposed parallel to said frame; and hanger means at corners of the frame pivotally connecting said frame to both said platform and said support, said hanger means comprising a first roller ball bearing assembly connecting said platform to said frame, and a second roller bearing assembly connecting said frame to said support, whereby the frame is tilted when a weight is placed on the platform.

2. A scale as defined by claim 1, wherein each hanger means further comprises a pair of parallel hanger plates having aligned holes therein, said first and second roller bearing assemblies being removably engaged in said aligned holes in the hanger plates in horizontally spaced disposition, a first eyebolt connected between the first roller bearing assembly and a corner of the platform, and second eyebolt connected between the second roller bearing assembly and said support, whereby the weight of the frame tends to restore it to horizontal position by turning the roller bearing assemblies in the hanger plates when the weight is removed from the platform.

3. A scale as defined by claim 1, further comprising a dial scale operable by a drawbar to turn a pointer on the dial, a plurality of interconnected levers connected between said drawbar and said frame; and other hanger means supporting said levers, whereby the pointer turns on the dial when the frame is tilted.

4. A scale as defined by claim 3, wherein said other hanger means include replaceable roller ball bearing assemblies at points of support of the levers.

5. A scale as defined by claim 2, further comprising a dial scale operable by a drawbar to turn a pointer on the dial, a plurality of interconnected levers connected between said drawbar and said frame; and other hanger means supporting said levers, whereby the pointer turns on the dial when the frame is tilted.

6. A scale as defined by claim 5, wherein said other hanger means include replaceable roller ball bearing assemblies at points of support of the levers.

7. A scale as defined by claim 2, wherein said frame comprises a pair of tubular bars at front and rear ends of the frame and a pair of flat bars at sides of the frame, said hanger plates being secured to the tubular bars near opposite ends thereof.

8. A scale as defined by claim 7, further comprising a dial scale operable by a drawbar to turn a pointer on the dial; a plurality of interconnected levers connected between said drawbar and one of said flat bars of the frame; and other hanger means pivotally supporting said levers and carried by said stationary support, whereby the pointer turns on the dial when the frame is tilted.

9. A scale as defined by claim 8, wherein said other hanger means includes replaceable roller ball bearing assemblies at points of support of the levers.

References Cited

UNITED STATES PATENTS

| 2,793,024 | 5/1957 | Rose et al. | |
| 2,812,935 | 11/1957 | Mettler et al. | 177—255 |
| 3,185,234 | 5/1965 | Lortz | 177—256 X |

RICHARD B. WILKINSON, Primary Examiner

G. H. MILLER, JR., Assistant Examiner

U.S. Cl. XR.

177—256